Feb. 22, 1966    J. R. PATMORE    3,237,002
BACKLASH SIMULATOR
Filed June 28, 1962
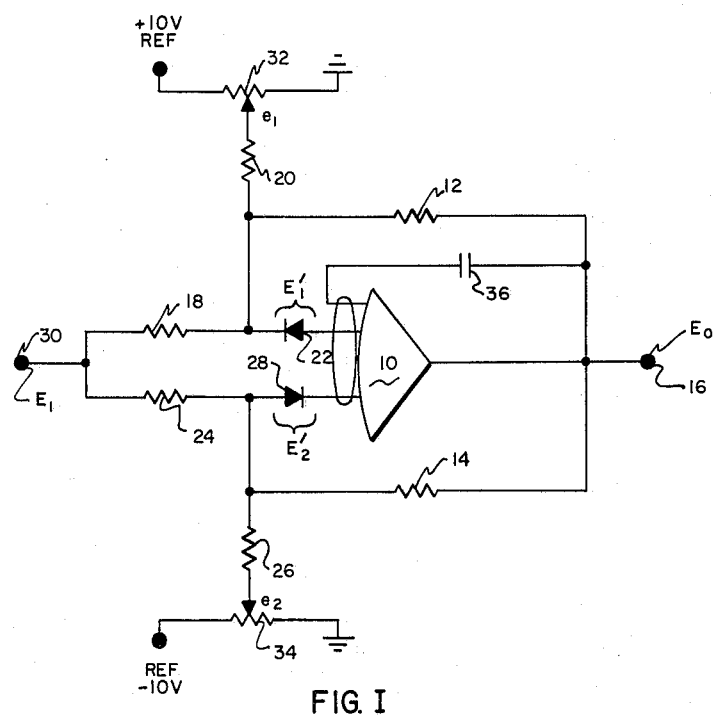
FIG. I
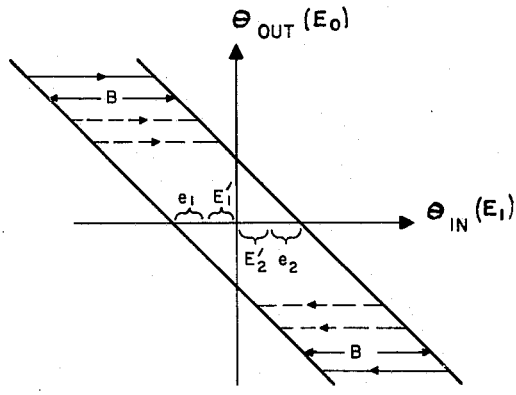
FIG. II
INVENTOR.
JAMES R. PATMORE
BY  E A Pettes
ATTORNEY United States Patent Office 3,237,002
Patented Feb. 22, 1966

3,237,002
BACKLASH SIMULATOR
James R. Patmore, Neptune, N.J., assignor to Electronic Associates Inc., Long Branch, N.J., a corporation of New Jersey
Filed June 28, 1962, Ser. No. 206,071
7 Claims. (Cl. 235—184)

This invention relates generally to apparatus for simulating non-linear physical phenomenon and more particularly to electronic apparatus for the simulation of backlash.

Computer simulation is an extremely useful tool for the dynamic analysis of various linear and non-linear physical systems. In the simulation of positional servomechanisms or the like, it is frequently necessary to generate the non-linear function of backlash which may be present in a gear box or gear train. The present methods of simulating backlash on a D.C. analog computer utilize at least two operational amplifiers which operate in conjunction with appropriate input and feedback elements. Since operational amplifiers are by far the single most important component in an electronic analog computer, earnest efforts are continuously being made to reduce the number of amplifiers required for the generation of any given function. The present invention was made with this end in mind in order to extend the range of usefulness of computers without extending the requirement for additional equipment.

Accordingly, it is an object of the present invention to provide a backlash simulator which is formed of a single operational amplifier.

Another object of the present invention is the provision of a backlash simulator formed of a single amplifier which can be adjusted to provide a varying time lag.

A further object of the present invention is the provision of a backlash simulator formed of a single amplifier which is capable of tracking rapidly varying input signals.

In its preferred form, the backlash simulator according to the present invention comprises a single operational amplifier including input and output terminals and a pair of amplifier input and feedback networks. A diode element is disposed within each of said feedback networks and an adjustable source of biasing potential is provided for each diode element. In response to an applied input signal which may correspond to input shaft rotation and which may be variable at some predetermined rate in one or any opposite direction, a correspondingly varying output signal or simulated output shaft rotation is produced. When, however, the input signal is reversed in direction, the output signal remains at a constant or fixed amplitude until after the input signal varies by a predetermined amount which may correspond to the backlash of the simulated device.

These and other objects, features and advantages will become apparent from the following description of the present invention taken in connection with the accompanying drawing wherein:

FIG. I is a schematic representation of a preferred embodiment of the present invention; and FIG. II illustrates the wave form of the output signal from the amplifier of FIG. I.

Turning now to FIG. I, the backlash simulator according to the present invention is seen to comprise an amplifier 10 which preferably has a high-gain, wide-band characteristic and is stabilized by suitable means, such as the well-known chopper stabilization circuit, details of which are not essential to an understanding of the present invention. The combination of input resistors, a feedback resistor and a high gain amplifier, such as 10, forms a well-known type of computing amplifier. The voltage appearing at the output of a computing amplifier is related to the voltage applied to an input resistor by the following expression:

(1) $$E_0 = -E_1 \frac{R_F}{R_i}$$

where:

$E_0$ is the output voltage
$E_1$ is the input voltage
$R_F$ is the feedback resistor, and
$R_i$ is the input resistor.

The linear expression above applies provided the output voltage is not required to be great enough so that the high gain amplifier becomes saturated. To assure that linear operation does prevail, the voltage levels applied to the input resistors are limited to appropriate positive and negative amplitudes.

Amplifier 10 is provided with feedback resistors 12 and 14 which have a common connection to the amplifier output terminal 16. An input resistor 18 and a bias resistor 20 are connected to the other end of resistor 12, and a diode 22 forms a connection between the input terminal of amplifier 10 and the juncture of resistors 12, 18 and 20. The other end of resistor 14 is similarly connected to a pair of resistors 24 and 26 and the juncture of these resistors is connected to the amplifier input terminal via diode element 28. The other ends of resistors 18 and 24 are connected in common to the input terminal 30 of the present simulator.

Diodes 22 and 28 are shown to be connected in a back-to-back relationship relative to the amplifier input terminal. As shown in the drawing, the diode 22 will conduct only upon application of negative input signals and the diode 28 will conduct only upon application of positive input signals. Suitable bias for the diodes is obtained via the resistors 20 and 26 which are shown to be connected to the sliding contacts of potentiometers 32 and 34, respectively. The potentiometers 32 and 34 are each connected across a suitable source of reference potential which may be of either positive or negative polarity with respect to ground, but which are shown, for purposes of illustration, to be of positive and negative polarity, respectively.

The present circuit is completed by the connection of a suitable high quality capacitor 36 between the amplifier input and output terminals. This capacitor integrates the input signal which is applied to the amplifier and also prevents the amplifier from being operated in an open-circuited manner. This capacitor, accordingly, introduces a component of friction into the output signal obtained from the present simulator, viz., prevents the output signal from drifting. When friction is negligible, the capacitor 36 may be eliminated.

Assuming now for the sake of illustration, in further discussion that in a gear box having an input and output shaft, the input shaft rotation is designated $\theta_{in}$ and the output shaft rotation is designated $\theta_{out}$. An expression for $\theta_{out}$ in terms of $\theta_{in}$ and backlash B may be written as (2) $$\theta_{out} = f(\theta_{in} B)$$

The shaft rotation $\theta_{in}$ is conveniently represented by an input ramp function of suitable positive or negative slope to represent a given or predetermined rate of rotation. If, for example, the input ramp function has a slope of $+1$, the output $\theta_{out}$ will also be a ramp function with slope of $-1$ after taking into account the backlash of the gear box. In the present invention, the backlash B can be represented as (3) $$B \approx |E_1'| + |E_2'| + e_1 - e_2$$

where $E_1'$ is the absolute magnitude of the voltage drop across diode 22

$E_2'$ is the absolute magnitude of the voltage drop across diode 28

$e_1$ is the bias potential applied to resistor 32, and $e_2$ is the bias potential applied to resistor 34.

If it is initially assumed that $e_1$ and $e_2$ are of some predetermined amplitude which back-biases the diodes 22 and 24, the input signal $\theta_{in}$ must rise to some amplitude which is either more positive than $e_1$ or more negative than $e_2$ before current will flow in either resistor 18 or resistor 24. Thereafter the voltage appearing at the juncture of resistor 18 or 24 and its respective diode must rise to an amplitude which is in excess of $E_1'$ or $E_2'$ before either diode will conduct. Upon conduction of either diode, a feedback signal is applied to the input of the amplifier via a corresponding one of the feedback resistors 12 or 14 to maintain the summing junction of the amplifier at substantially ground potential.

Since the diodes 22 and 28 are included within the feedback loop of the high gain amplifier, the overall characteristics of the amplifier are linear to a high degree and substantially independent of the diode voltage drop and the non-linear diode characteristics. In FIG. II, the voltages $E_1'$, $E_2'$, $e_1$ and $e_2$ are shown generally for the reason that they are variable in practice. For example, $e_1$ and $e_2$ are dependent upon the setting of the potentiometers 32 and 34, while $E_1'$ and $E_2'$ are dependent upon the particular diode which may be selected.

For purposes of illustration, it will be assumed that $E_1'$ and $E_2'$ are equal to 0.75 volt and that potentiometers 32 and 34 are adjusted such that $e_1$ and $e_2$ are each 1 volt. If the input voltage $\theta_{in}$ now varies linearly in amplitude from zero with a slope of $+1$, the input signal must rise to 1.75 volts before the effects of $E_2'$ and $e_2$ are overcome, and the diode 28 conducts. Upon conduction of diode 28, the output signal $\theta_{out}$ will follow or track the input signal and this output signal will have a negative polarity and will increase in amplitude at a slope of $-1$.

Assuming now that it is desired to reverse the rotation of the gear box, the input signal is caused to decay in amplitude at the same slope, viz, reverse its direction of rotation. If the output signal $\theta_{out}$ is $-5.00$ volts when this occurs, it can be seen that the input signal $\theta_{in}$ is then at an amplitude of $+6.75$ volts. When $\theta_{in}$ begins to decay from 6.75 volts, the diode 28 immediately ceases to conduct. The output signal $\theta_{out}$, however, remains at $-5.00$ volts as a result of the storage effect of capacitor 36 while the input signal $\theta_{in}$ decays in amplitude. When $\theta_{in}$ decays to $+4.00$ volts, the algebraic sum of $\theta_{in}$ and $e_1$ equals the output signal $\theta_{out}$ and the cathode of diode 22 is then at 0 volt. A further decay in $\theta_{in}$ by an amount equal to $E_1'$ will produce conduction of diode 22, and, thereafter, further decreases in the amplitude of $\theta_{in}$ will produce corresponding decreases in the amplitude of $\theta_{out}$.

The backlash B for the above example is seen to be equal to 3.50 volts, and is seen to conform to the value of B which would be computed by use of Equation 3. Accordingly, in the present example, the input signal $\theta_{in}$ must vary by 3.50 volts each time that its direction of movement is reversed and before the output signal $\theta_{out}$ will follow or track variations in the input signals. In this manner, the non-linearities of backlash may be accurately represented. It will be understood that if the frequency of those variations are of a high order of magnitude then the amplifier 10 distributed capacitance may be of sufficient value to provide the above storage effect.

While only one embodiment of the invention has been shown and described herein, and inasmuch as this invention is subject to many modifications, variations, and reversals of parts, it is intended that all matter contained herein shall be interpreted as illustrative and not in a limiting sense.

I claim:

1. An electronic system for the dynamic simulation of backlash in response to input signals variable in either one or an opposite direction at a predetermined slope, comprising
    a high gain amplifier including input and output terminals, electrical storage means connected between said input and output terminals of said amplifier,
    first and second feedback circuits having a common connection to said output terminal,
    first and second input circuits having a common connection to the source of input signals,
    first and second unidirectional conducting means connecting said first and second input and feedback circuits to said input terminal respectively, and
    means including a source of potential connected to said unidirectional conducting means and providing bias therefor, whereby variations are produced in the amplitude of the output signal from said amplifier upon a reversal of the direction of the input signal only after a predetermined change in the amplitude thereof.

2. An electronic system for the dynamic simulation of backlash according to claim 1 in which said first and second unidirectional conducting elements comprise diodes connected in a back-to-back relationship relative to said amplifier input terminal.

3. An electronic system for the dynamic simulation of backlash according to claim 2, in which the means including a source of potential provides an adjustable back-bias for said diodes.

4. An electronic system for the dynamic simulation of backlash in response to input signals variable in either one or an opposite direction at a constant slope, comprising
    an amplifier including input and output terminals,
    first and second feedback circuits having a common connection to said output terminal,
    a capacitor connected between said input and output terminals,
    an input circuit corresponding to each said feedback circuits and having a common connection to the source of input signals,
    unidirectional conducting means corresponding to each said feedback circuits and connecting said first and second input and feedback circuits to said input terminal respectively, and means including a source of potential connected to said unidirectional conducting means and providing bias therefor, whereby upon a reversal of the direction of the input signal the amplitude of the output signal remains unchanged until after a predetermined change in the amplitude of the input signal.

5. An electronic system for the dynamic simulation of backlash in response to input signals variable in either one or an opposite direction at a constant slope, comprising
    an amplifier including a feedback capacitor connected between its input and output terminals,
    first and second feedback resistors having a common connection to said output terminal,
    an input resistor corresponding to each said feedback resistor and having a common connection to the source of input signals,
    a unidirectional conducting element corresponding to each said feedback resistor and providing a connection from said input terminal to said corresponding feedback and input resistors, and
    means including a source of potential connected to said unidirectional conducting means and providing bias therefor, whereby upon a reversal in the direction of the input signal, the amplitude of the output signal from said amplifier remains unchanged until after the amplitude of the input signal changes by a predetermined amount.

6. An electronic system for the dynamic simulation of backlash in response to input signals variable in either one or an opposite direction at a constant slope, comprising an amplifier including a feedback capacitor connected between its input and output terminals, first and second feedback resistors having a common connection to said output terminal, an input resistor corresponding to each said feedback resistor and having a common connection to the source of input signals, a diode element corresponding to each said feedback resistor and forming a connection from said input terminal to said corresponding feedback and input resistor, said diode elements being connected in a back-to-back relationship relative to said input terminal, and means including a source of adjustable amplitude potential connected to each said diode element and providing bias therefor, whereby upon a reversal in the direction of the input signal, the amplitude of the output signal from said amplifier remains unchanged until after the amplitude of the input signal changes by a predetermined amount.

7. An electronic system for the dynamic simulation of backlash according to claim 6 wherein upon a reversal in the direction of the input signal, the amplitude of the output signal from said amplifier remains unchanged until after the amplitude of the input signal changes by an amount substantially equal to the sum of the voltage drops across said diodes and the sum of the adjusted amplitudes of said biasing potentials.

References Cited by the Examiner
UNITED STATES PATENTS 3,076,901  2/1963  Rubin et al. _____ 328—150 X
3,092,729  6/1963  Cray _____ 330—110 X

OTHER REFERENCES

R. Howe: Analog Techniques, in Instruments and Control Systems, vol. 34, pages 1482–1484, August 1961.

MALCOLM A. MORRISON, *Primary Examiner.*

K. W. DOBYNS, I. KESCHNER, *Assistant Examiners.*